March 3, 1959 — I. D. ALKIRE — 2,875,917
HIGH TEMPERATURE SPRING SEAL
Filed July 2, 1956 — 2 Sheets-Sheet 1
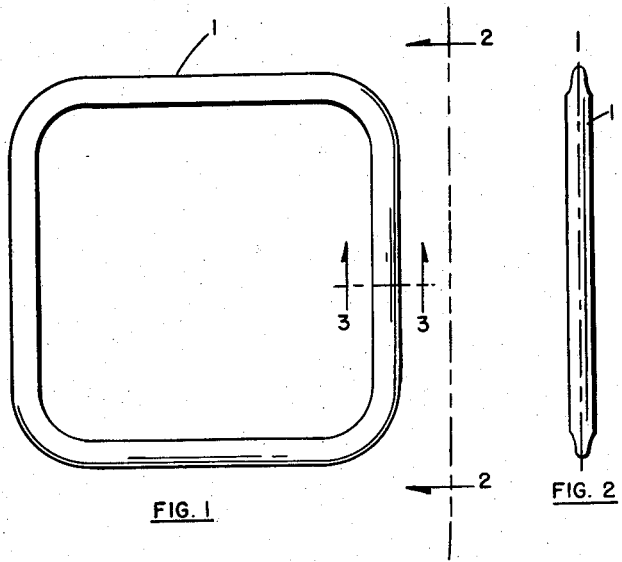
FIG. 1
FIG. 2
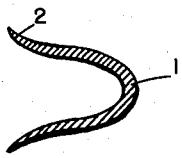
FIG. 3
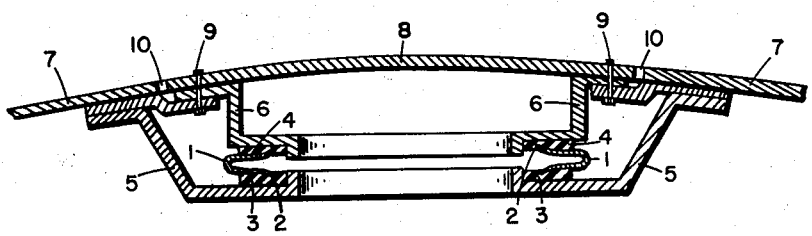
FIG. 4
INVENTOR.
INNIS D. ALKIRE
BY William R. Lane
ATTORNEY March 3, 1959     I. D. ALKIRE     2,875,917
HIGH TEMPERATURE SPRING SEAL Filed July 2, 1956     2 Sheets-Sheet 2

INVENTOR.
INNIS D. ALKIRE

BY

ATTORNEY

2,875,917

HIGH TEMPERATURE SPRING SEAL

Innis D. Alkire, Monterey Park, Calif., assignor to North American Aviation, Inc.

Application July 2, 1956, Serial No. 595,168

6 Claims. (Cl. 220—46)

This invention relates to a high temperature spring seal and more particularly, to a seal for aircraft and missile doors.

The seal of the present invention is comprised of a thin, high strength, channel-shaped, diverging and/or converging metal spring of substantially constant cross section formed into a hoop or other closed continuous configuration. The sealing is effected with the spaced outer walls of the substantially clip-shaped spring and gaskets held by retainers.

Prior to the development of the supersonic aircraft and missiles, soft rubber-like gaskets or inflated type seals were used. The skin temperatures of these higher speed air-borne bodies are in the range between 600° and 800° F. at which temperatures the soft, sponge type seals are unsatisfactory. Other well-known seals, such as the flexible spiral type gasket, made primarily for heavy steel piping, are not satisfactory because they do not flex enough to form a seal between sheet metal structures. In these applications, leaks are caused by deflections in the metals due to inflight strains and stresses and high temperatures which produce uneven surfaces and varying gaps around the seal.

The present invention has a number of advantages over existing seals. One is the extreme light weight of the spring seal itself. Another is the light weight of the seal retainers. These light weight structures are made possible by the fact that the internal pressure acting on the inside of the spring channel is balanced by the pressure acting against the retainers. The reaction of the pressure on the spring and retainers, in effect against itself through the seal assembly, eliminates the need for heavy back up structure on the retainers. Further, this structure provides automatic pressure compensation because as the internal pressure increases within the sealed body, the spring pressure on the gaskets increases by a corresponding amount. This feature gives the spring seal a decided advantage over most other types of seals which tend to leak increasingly as the pressure increases. Another advantage is the ease with which the spring and gaskets can be inserted and replaced.

The present invention is adapted for high temperature usage typically with silicon and boron plastic gaskets. The seal remains effective even though the gaskets tend to flow a small amount at the higher temperatures. Ventilation of the gaskets on the high pressure and low pressure sides allows the volatiles in the plastic seals to escape to prevent reversion back to the metal constituent, the volatiles being solvents. Ventilation space as small as 0.01" is sufficient to allow the volatiles to escape.

According to the present invention, the actual sealing of a compartment may occur, depending upon space limitations, 5" or 6" inward from the external skin of the missile where the temperature is considerably lower than that on the skin. In this type of construction, gaskets of material, such as neoprene can be used successfully.

It is therefore an object of this invention to provide an improved seal.

It is a further object of this invention to provide a high temperature, light weight seal.

It is a principal object of this invention to provide a seal which is pressure responsive, that is, the higher the pressure the greater the tendency to seal.

It is another object of this invention to provide a seal which is easy to assemble and disassemble.

Other objects of invention will become apparent from the following description taken in connection with the accompanying drawings, in which Fig. 1 is a plan view of the continuous, substantially channel-shaped spring;

Fig. 2 is a view of the sealing spring taken along the line 2—2 of Fig. 1;

Fig. 3 is a view of the sealing spring taken along the line 3—3 of Fig. 1;

Fig. 4 is a cross-sectional view of the present invention in sealing position adjacent the skin of a sealed body;

Figure 6:
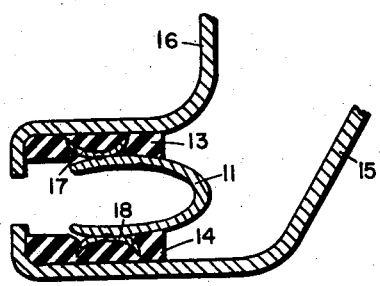

And Fig. 6 is a cross-sectional view of another embodiment of the present invention.

Referring to Figs. 1–5, spring 1 has a diverging channel-shaped, substantially constant cross section and has two outwardly extending lips 2 on each wall. Spring 1 is made to flex outward and may be of thin metal so that it can easily be compressed. It is continuous and may form any geometrically plane shape, such as a square, circle or trapezoid, each preferably having rounded corners. It is desirable that the center line through the structure, illustrated in Fig. 2, be a line in a center plane through the spring, said plane being at right angles to the direction of the flexing of the walls of the channel. This configuration is preferable because any flexing not perpendicular to the center line plane causes the spring to be stiffer than it is if the flexing is perpendicular to that plane. In other words, the direction of flexing of the lips need not be perpendicular to the plane of the corners; however, if it is not, a greater pressure is required, especially at the corners, to cause the spring to flex.

In Fig. 4 is shown a curved surface of a sealed body, such as that of a guided missile, having a skin 7 with an opening 10 therein, which is closed by cover 8 and is sealed by the assembly surrounding spring 1. Spring 1 is shown having a rectilinear configuration in contrast to curved surface 7 and door 8. The spring may also be curved to follow the shape of the sealed body, but such a curve tends to stiffen the spring, and some resiliency is thereby lost. Retainer 6 is fixed to cover 8 and retainer 5 is fixed to the interior of the skin. The retainers are secured to their respective surfaces to form a seal with them, such as may be made with a continuous weld. Retainer 6 has gasket 4 in contact with the interior thereof and in the same manner, gasket 3 is in contact with retainer 5 so that the retainers and gaskets are juxtaposed. These gaskets, for temperatures in the 600°–800° F. range, are preferably made of silicon or boron plastics. For lower temperatures, in the 300°–400° F. range, gaskets made of materials such as neoprene may be used. Spring 1 is between gaskets 3 and 4, having its lips 2 directed into them.

Figure 5:
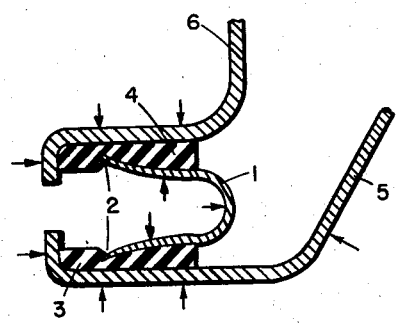
Fig. 5 is an enlarged cross-sectional view of a portion of Fig. 4, showing the details of the spring and gaskets between the retainers.

To install the seal, cover 8, being removed from the body, spring 1 is placed on gasket 3 so that its lower lip is in contact therewith. When opening 10 is to be closed, cover 8 is placed so that the gasket on retainer 6 is in contact with the upper lip on spring 1. Cover 8 is then bolted to a portion of body 7 which is external of retainer 5. The seal is formed within the body between the gaskets and around the retainers. Bolts 9 are attached, that is, they extend into the body between the retainers, outward from the seal, in an unsealed space, and thus, may be of an ordinary type. The installation of the door 8 presses spring 1 from its open cross section, as shown in Fig. 3, to the cross section, as shown in Figs. 4 and 5. This compression forces the edges of the spring into the gaskets, and the yielding of the gaskets furnishes the initial seal. As the internal pressure increases, indicated by the arrows in Fig. 5, the spring presses harder against the gaskets and retainers, thus holding any pressure up to the point of tensile failure of the spring. Retainers 5 and 6 may be made of light weight metal, such as stainless steel. It is desirable that the spring and retainers expand at the same rate. This is accomplished by using the same kind of metal in both or by using metals having approximately the same coefficients of expansion. Under pressure, the retainers are also somewhat flexible so that the pressure acting on the inside of the spring is compensated by the pressure acting against the retainers. This reaction of the pressure, in effect acting against itself throughout the seal assembly, allows the retainers to be very light weight structure. It is clear from the description of the method of assembly that the seal is very easily inserted and removed. It is also clear, by means of the arrows indicating in the direction of pressure in Fig. 5, how an increase of pressure within the body makes for more positive sealing action.

Referring to Fig. 6, which illustrates another embodiment of the present invention, trap channels 17 and 18 are secured in sealed contact on the exterior of spring 11. These trap channels, preferably having outwardly diverging walls, are embedded in gaskets 13 and 14 in the same manner as the lips on the ends of spring 1. Spring 11 is shown to be convergent and without lips but would be equally effective with diverging legs having lips. Gaskets 13 and 14 are in contact with retainers 16 and 15, respectively. The purpose of trap channels 17 and 18 is to hold any slightly flowing gasket material within their walls and thereby effect a better seal than would be otherwise possible where the gasket may tend to melt or have high temperature plastic flow. This configuration would also allow the ventilation of the gasket to permit the volatiles to escape and prevent the reversion back to the pure metallic constituent.

As previously indicated, the spring is a better seal when it has a straight line profile along its lips, shown in Fig. 2. By placing a linear seal assembly inward from a rounded skin surface, a straight line configuration can be made to fit as well as a curved configuration. In addition, the farther inward the seal is located the lower the temperature and the least likelihood of gasket failure.

The present invention, thus, provides a new sealing means which is unaffected by deflections caused by high temperatures or flight conditions, and in which a high temperature gasket will stand greater temperatures because it is satisfactorily ventilated.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Means to seal a leak passage between a first and a second separate space comprising a resilient channel sealing member of substantially constant cross-section having a first and a second continuous side wall and having a length substantially co-extensive with said passage, said side walls each having an inner and an outer face, a first and a second retaining means in spaced relation and adjacent the side walls of said channel member, a first resilient gasket abutting said first retaining means and being in continuous contact with said first side wall of said channel member, and a second resilient gasket abutting said second retaining member and being in continuous contact with said second side wall of said channel member, each of the walls of said channel member having at least one projected lip projecting into said respective adjacent contacting gaskets, said outer faces being exposed to a first space and said inner faces being exposed to a second separate space.

2. The invention as claimed in claim 1 wherein each of said outer side walls diverge from each other more rapidly at their ends than at the main portions of the walls and said projected lip is said end of each of said walls respectively.

3. The invention as claimed in claim 1 wherein a second and a third channel members are provided extending along said first and second outer side walls respectively and said projected lip is the end of one of the side walls of each of said second and third channel members respectively.

4. The invention in claim 1 wherein said first and second retaining means each have a balancing surface located opposite and facing opposite the surface on which are held said first and second gasket respectively, and fluid pressure connecting means are provided connecting said balancing surfaces and the interior section of said channel member formed by said outer side walls, whereby the force of the fluid pressure on said retaining means is balanced.

5. In combination a cover and a seal for closing an opening in a body, said seal comprising a continuous, spring channel member of substantially constant cross-section and having two outer side walls, said cover and body opening having the same general plane configuration as said channel, a first retaining means mounted to said cover and spaced from said cover within said body, a first gasket secured to said retaining means and being in continuous contact with one of said outer side walls of said channel member, a second retaining means mounted to and spaced from said body and closely spaced from said first retaining means, and a second gasket secured to said second retaining means and being in continuous contact with the other outer side wall of said channel member, said channel member having the interiors of said walls exposed to the interior of said body, the ends of said walls of said channel member diverging more rapidly than the main portion of the walls forming projected lips projecting into said adjacent contacting gaskets.

6. In combination, a cover and a seal for closing an opening in a body, said seal comprising a spring channel member having two continuous outer side walls and having a length substantially co-extensive with the joint between the cover and the opening in the body, a first retaining means mounted to said cover and spaced from said cover within said body, a first gasket secured to said retaining means and being in continuous contact with one of said side walls of said channel member, a second retaining means mounted to and spaced from said body and closely spaced from said first retaining means, a second gasket secured to said second retaining means and being in continuous contact with the other side wall of said channel member, and on each of said side walls a projected lip extending the length of said wall and projecting into the respective adjacent contacting gasket.

References Cited in the file of this patent

UNITED STATES PATENTS

| | | |
|---|---|---|
| 1,143,049 | Johnson | June 15, 1915 |
| 1,621,272 | Raymond | Mar. 15, 1927 |
| 1,968,200 | Greve | July 31, 1934 |
| 2,243,754 | Honegger | May 27, 1941 |
| 2,451,599 | Wiltse | Oct. 19, 1948 |
| 2,641,381 | Bertrand | June 9, 1953 |

FOREIGN PATENTS

| | | |
|---|---|---|
| 397,603 | Great Britain | Aug. 31, 1933 |